(12) United States Patent
Hallissy et al.

(10) Patent No.: US 6,960,388 B2
(45) Date of Patent: Nov. 1, 2005

(54) ELECTRICAL DISTRIBUTION SYSTEM COMPONENTS WITH FIRE RESISTANT INSULATIVE COATING

(76) Inventors: Gerald Hallissy, 15 Overlook Dr., Port Washington, NY (US) 11050; William G. Higbie, 4062-81 Grumman Blvd., Calverton, NY (US) 11933; Anthony Camarota, 9 Kane Industrial Dr., Hudson, MA (US) 01749; John B. Rowen, 9 Kane Industrial Dr., Hudson, MA (US) 01749

( * ) Notice: Subject to any disclaimer, the term of this patent is extended or adjusted under 35 U.S.C. 154(b) by 176 days.

(21) Appl. No.: 10/243,632

(22) Filed: Sep. 13, 2002

(65) Prior Publication Data

US 2004/0054035 A1 Mar. 18, 2004

(51) Int. Cl.$^7$ ............................ C09D 5/18; B32B 15/04
(52) U.S. Cl. ...................... 428/372; 428/376; 428/377; 428/457
(58) Field of Search .................................. 428/372, 376, 428/377, 457

(56) References Cited

U.S. PATENT DOCUMENTS

| | | | | | |
|---|---|---|---|---|---|
| 3,875,971 | A | * | 4/1975 | Hamling | 138/146 |
| 5,356,568 | A | * | 10/1994 | Levine | 252/606 |
| 5,400,830 | A | * | 3/1995 | Stiles et al. | 138/149 |
| 6,153,674 | A | * | 11/2000 | Landin | 524/35 |
| 6,228,914 | B1 | * | 5/2001 | Ford et al. | 524/124 |
| 6,338,366 | B1 | * | 1/2002 | Williams | 138/149 |

* cited by examiner

Primary Examiner—Kriellion A. Sanders
(74) Attorney, Agent, or Firm—Brooks Kushman P.C.

(57) ABSTRACT

Aqueous coating compositions containing a film-forming polymer, at least one flame retardant or smoke suppressant, glass or ceramic microballoons, and expandable flake graphite may be applied to building components pre- or post-installation, and provide a flexible and adherent coating. When exposed to heat, the coating expands to form an insulative yet cohesive layer which protects the component from fire-induced damage.

17 Claims, No Drawings

ELECTRICAL DISTRIBUTION SYSTEM COMPONENTS WITH FIRE RESISTANT INSULATIVE COATING

BACKGROUND OF THE INVENTION

1. Field of the Invention

The present invention pertains to coatings for use on electrical conduits, water supply lines, and structural materials, which are flexible, adherent, and when exposed to high temperatures, expand to form an insulative yet coherent coating. The invention further pertains to articles coated with the inventive coating, both pre- and post-installation.

2. Description of the Related Art

A significant contributing cause to the destruction of buildings and other structures by fire is damage to structural, utilitarian, and life safety components. Intense heat generated by fire and/or explosion can severely weaken structural steel, contributing to building collapse. This effect is believed to have been a significant factor in the collapse of the World Trade Center towers in September of 2001. It would be desirable to minimize damage to such structural components. However, minimizing damage to utilitarian and life safety components such as water supply lines for fire sprinkler systems and electrical conduits is also of paramount importance.

Damage to water lines which supply fire sprinkler systems results in the inability of such systems to work for their intended purpose. Damage to electrical systems not only opens up the possibility of additional incendiary sources caused by shorting of electrical cables encased in conduit, but also destroys communication capabilities and emergency power sources, which then may lead to increased personal injury and loss of life. The larger the structure, the more important it becomes to minimize damage to all components.

In the past, structural steel has often been covered with insulative material containing inorganic binders. This material has conventionally been rather thick, and once cured in place, is relatively inflexible. The binder systems used often deteriorate with age, or due to inadequate adhesion to the substrate, cause the material to fall away from the substrate, particularly in tall buildings where appreciable movement and/or bending of the components is expected. The binder systems employed also make the insulative material susceptible to being easily destroyed upon impact. For example, examination of the World Trade Center prior to the incident leading to its collapse showed large portions of structure which had once been coated with insulation to be substantially free of such insulation (missing). The remaining insulation was instantly destroyed by impact or the subsequent inferno. The same type of insulation materials have been used for water lines, with similar problems.

Electrical conduit poses unique problems, in particular because use of electrical conduit in buildings and infrastructure is extensive, and because conduit is frequently bent to conform to routing requirements. In the past, both structural and utilitarian building components have only been covered by insulation after installation. Post-installation covering is mandated both by the thickness and lack of durability of prior insulation systems as well as the inability of such systems to survive bending operations.

Durable insulation systems have generally been used only for noise attenuation or thermal insulation, i.e. to decrease heat flow to the surroundings from hot conveying lines, and have also suffered from a lack of insulation efficiency or high cost. For example, in U.S. Pat. No. 3,875,971, ceramic coated metal articles are disclosed. These articles are produced by adhering zirconia in the form of powder, fiber, tape, or woven material to metal by means of a ceramic enamel. However, such articles are relatively expensive, and cannot withstand bending operations.

In U.S. Pat. No. 6,338,366, pipe insulation in the form of a thin sleeve secured by strap-type clamps is disclosed. However, such insulation must be applied post-installation, and cannot be applied to structural steel without unique and expensive clamping means. Similar jacketed insulation has been used for many years on steam pipes. Such insulation is not intended for resistance to fire.

U.S. Pat. No. 5,400,830 discloses a vehicle exhaust pipe which appears to be deformable, comprising an inner metal pipe, a layer of ceramic insulating material, and a surrounding jacket of a high temperature-resistant thermoplastic. The result is a relatively bulky structure due to the thickness of the insulative layer required to prevent damage to the thermoplastic exterior. Further, the high temperature thermoplastic material is relatively expensive. Such products are designed to keep heat within, for example to provide for more rapid light-off in catalytic converters. If exposed to high temperature from the outside, even the high melt thermoplastics would be rapidly destroyed.

It would be desirable to provide a fire protective insulative system which is relatively inexpensive, which is non-bulky, which is highly adherent, which can be applied either pre- or post-installation, and which is capable of being deformed such that components such as electrical conduit can be supplied already coated with the insulative system and bent employing conventional bending tools without causing loss of the insulation system.

It would be further desirable to provide a flexible fire protection insulative system which when exposed to fire forms a char which protects and insulates the substrate, i.e. structural members, utilities, power and communications lines, etc., from fire damage.

It would be further desirable to provide an insulation system which is substantially non-toxic, which employs little or no volatile organic solvents, and which liberates few toxic byproducts when exposed to high temperature.

SUMMARY OF THE INVENTION

It has been now surprisingly discovered that an adherent and flexible coating system can be provided which is capable of applying to components desired to be protected either pre- or post-installation, and which provides high thermal insulation efficiency. The coating system contains an aqueous dispersion of a film-forming polymer, glass or ceramic microballoons, one or more flame-retardant additives, and expandable graphite.

DETAILED DESCRIPTION OF THE PREFERRED EMBODIMENTS

The aqueous dispersion of film-forming polymer comprises a dispersion of a thermoplastic or thermosettable polymer in the form of fine particles dispersed in water. The polymer may be self-dispersing, or may be dispersed with the aid of conventional dispersants, including surfactants and colloidal stabilizers., and contains the polymer in solid form, i.e. preferably is free of solvents in which the polymer is soluble.

The polymer of the film-forming polymer may be any polymer which is capable of coalescing to a flexible film under the application conditions. For example, where pre-installation coating is contemplated, and where elevated temperatures are employed in the manufacture of coated components such as structural steel, water pipes, or conduit, the film formation or coalescence temperature may be such that virtually no coalescence at room temperature occurs, but coalescence at higher temperatures will take place. Examples of such polymers include aqueous dispersions of polyamide polymers, polyethylene polymers, polypropylene polymers, and certain polyester polymers. When coalescence at room temperature is desired, lower molecular weight oligomers of the above polymers may be employed, or traditional film-forming polymers such as polyester polymers, vinyl ester polymers, vinyl ester/ethylene copolymers, acrylate polymers, styrene/acrylate copolymers, styrene/butadiene copolymers, and a variety of natural and synthetic latexes and the like may be used. It is preferable that the polymers contain polar groups to increase adhesion to the substrate, for example by including co- or termonomers such as acrylamide, acrylic acid, maleic acid and/or fumaric acid, and the like. Polyurethane dispersions may also be used. Particularly preferred are styrene/acrylic copolymers containing moieties derived from an unsaturated carboxylic acid. Halogen-containing polymers are preferably used in low amounts and most preferably avoided.

Such film-forming polymer dispersions are widely available commercially from a variety of sources, and include aqueous latexes as well as redispersible polymer powders which can be redispersed in water. Preferred film forming polymers are styrene/acrylic emulsions such as Paranol™ SA207 and Paranol™ SA220 manufactured by Para-Chem, Simpsonville, S.C.

The film-forming polymer may also constitute thermosettable polymers. Examples include epoxy resin dispersions such as the WRL dispersions available from WR Grace & Co., and GEN™ waterborne epoxy resins available from Shell Chemical Co. Epoxy resins may also be used in two-part formulations, with the curing agent dispersion kept separate from the epoxy dispersion until just prior to application. Examples of two-part waterborne epoxy compositions include Ancarez® AR 550 available from Air Products and Chemicals Co. Curable unsaturated polyester dispersions may also be used, as well as curable urethane dispersions, both one component and two component. Thermosettable film-forming polymers may be used in conjunction with conventional film-forming thermoplastic polymers. For example, epoxy resin dispersions can be added to styrene/acrylate copolymer dispersions to aid in adherence of the coating and to increase coating cohesion. Thermosettable polymers which form relatively brittle coatings, such as phenol/formaldehyde condensates, should generally be avoided, unless used in conjunction with more flexible thermoplastic or thermosettable polymers.

If the film-forming polymer contains sufficient polar groups, i.e., carboxyl groups, it may be self-dispersing. Frequently, however, surfactants or protective colloids are added to disperse the polymer or to maintain a stable dispersion. Examples of suitable surfactants include conventional anionic, cationic, zwitterionic, and non-ionic surfactants. Suitable protective colloids include various starches, derivatized celluloses, and in particular, partially or fully hydrolyzed polyvinylacetate polymers (polyvinyl alcohols). The film-forming polymer dispersions are generally provided with a solids content of 20 to 80%, preferably 50 to 80% by weight. However, it is the amount of polymer solids in the coating which is important, not the solids content of the dispersion per se. The coating contains from 10 to 45 weight percent film-forming polymer solids, more preferably, 20 to 40 weight percent, and more preferably 20 to 30 weight percent.

Preferred flame retardants comprise one or more constituents from four functional classes of ingredients: an acid forming catalyst/initiator; a carbonific or carbon source; a blowing agent, i.e. source of nonflammable gas and/or water; and inorganic ingredients which may be reactive or non-reactive. Each of the components of the preferred compositions of the present invention contributes a specific property to the formulation and each is critical to the success of the invention in yielding a reduced propensity for the resin so treated to burn, smoke, generate toxic gases or transmit heat. Suitable flame retardant compositions are described in U.S. Pat. Nos. 5,356,568 and 6,228,914, herein incorporated by reference.

In a preferred embodiment, the primary carbonific of the flame retardant composition is dipentaerythritol or tripentaerythritol. The carbonific, simply stated, is a source of carbon. It is the purpose of the carbonific to produce a carbon char layer to insulate the underlying uncombusted resin and finished structure from greater thermal damage. It should be understood, that the resin itself with which the flame retardant additive is mixed can also be a source of carbon, and, thus, a carbonific. In the case where the resin is a carbonific, the amount of primary carbonific can accordingly be adjusted downward if the resin is also to be relied upon as a carbonific for the combustion process. In other embodiments, the carbonific material may be selected from among dipentaerythritol, pentaerythritol polyurethane, phenol, triethylene glycol, resorcinol, and simple sugars and di- and polysaccharides such as inositol, sorbitol, dextrin, and starch.

The blowing agent is a compound or compounds which generate gas upon being exposed to high temperature in the presence of the remaining coating ingredients, preferably the remaining ingredients of the flame retardant composition. The preferred blowing agent is primarily comprised of melamine. However, a variety of melamine derivatives and formaldehyde condensates thereof are also heat decomposition of melamine produces ammonia, urea, water, carbon dioxide, etc. Azo-type blowing agents which generally generate nitrogen gas are useful, as are other blowing agents which are stable at ordinary temperatures, such as azodicarbonamide, oxybisbenzenesulfonylhydrazide, and 5-phenyltetrazole. The gases generated act to expand the volume of the resin during combustion. The gases help produce a multicellular foamy resin which insulates and protects the resin and structure from additional heat. In further embodiments, the heat activated blowing agent is selected from the group consisting of urea, butyl urea, dicyandiamide, benzene sulfonyl-hydrazide, melamine, guanidine, and glycine.

A halogen-containing material is preferably a component of the fire retardant. The halogen-containing material is preferably a chlorinated paraffin, most preferably, a mixture of a chlorinated paraffin containing about 70% by weight of chlorine and chlorinated paraffin containing about 40% by weight of chlorine. The weight ratio of 70% chlorinated paraffin to 40% chlorinated paraffin is preferably from about 1:2.

The halogen containing material serves several functions. It acts as a carbonific, a blowing agent and a fire snuffing agent. On exposure to heat it is reduced to char (carbonific) liberating halogen gas (blowing agent) which combines with or scavenges free-radicals generated during rapid oxidation, thus, aiding in the extinguishing of flames (fire snuffing agent).

The flame retardant preferably contains phosphorous-containing materials such as ammonium polyphosphate and tris (betachloroethyl) phosphate at approximately a 10:1 ratio. The phosphorous containing material serves as a catalyst to activate the melamine blowing agent and, in addition, reacts with the carbonific, further consuming it and generating carbon. Under the influence of heat from a fire or otherwise, the catalyst decomposes, yielding phosphoric acid. The reactive phosphoric acid produced by the breakdown of the catalyst reacts with both the amine function of the melamine and the hydroxy function of the carbonific to produce water. In addition, under the applied and generated heat, the organic components of the resin composite are degraded producing yet additional insulating char. In other embodiments, the phosphate material is selected from the group consisting of ammonium polyphosphate, tris(2,3-dibromopropyl) phosphate, tris(beta-chloroethyl) phosphate, guanidine phosphate, urea phosphate, melamine phosphate, monoammonium phosphate, diammonium phosphate, and mixtures thereof.

The heat resistant inorganic material can include a mixture of any suitable heat resistant materials, e.g., silica flour, heat and flame resistant material, e.g., glass beads, etc, and calcium aluminate cement. The inorganic material is also multifunctional. In a resin composition, the inorganic material can enhance the overall strength and impact resistance of a finished product made with the composition resin. As an advantage of the invention, the inorganic material can be tailored for adhesion, flame retardance, and flexibility. The inorganic can also serve as a heat deflector. At extremely high temperatures, the inorganic material melts to form a frit, which is highly insulative and heat resistant. While not wishing to be bound to any particular theory, it is believed that upon exposure to a high temperature radiant heat source, hot gas, or open flame, the preferred smoke suppressants activate stepwise. In the earliest phase of activation, acid forming substances such as ammonium polyphosphate and tris(β-chloroethyl)phosphate decompose to form strong acid byproducts which dehydrate available polymers and react with carbonifics to generate initiators which are ester based. After a complex series of reactions and decompositions not fully understood, the remaining strong acid decomposition products or those initially involved in the first stage of activation, or both, cause formation of unsaturated compounds from the organic ingredients, which subsequently char. As the temperature rises, carbonifics, for example 40% to 70% chlorinated paraffin and dipentaerythritol begin to decompose. This decomposition, because it is catalyzed, occurs at a lower temperature than ordinarily expected. The carbonific materials and/or their decomposition products bind with the dehydrated polymer to provide a matrix of carbonaceous material which imports structural integrity to the char layer. The blowing agent, i.e. melamine, begins to decompose, yielding large quantities of both non-flammable gases and water in addition to further char. The initial fusion of the solid melamine, its decomposition, and the water generated all serve to absorb heat and thus cool the affected environment.

The powdered composition according to the invention is "active." By being active, the composition has a latent ability to intumesce or foam when a specific temperature is reached. This is due to the nature of a blowing agent, which is a part of the composition. In a preferred embodiment, that temperature of flame or heat retardation is 250° C. At this temperature, and above, the cured or hardened resin/composite structure resists combustion, self-extinguishes without the direct application of a flame extinguisher, and produces a smaller quantity of less toxic smoke than similar parts made without use of the invention.

In a preferred embodiment, the composition, by weight, of the flame retardant additive formulation is:

| | Ingredient | Wgt. % Range | Function |
|---|---|---|---|
| a) | Dipentaerythritol | 10.0 - 12.0 | carbonific |
| b) | Melamine | 15.5 - 17.5 | blowing agent |
| c) | Chlorinated Paraffin - 40% | 4.0 - 6.0 | halogen material |
| d) | Chlorinated Paraffin - 70% | 8.0 - 11.0 | halogen material |
| e) | Ammonium polyphosphate | 27.5 - 29.9 | phosphorous |
| f) | Tris(betachloroethyl)phosphate | 2.5 - 4.5 | phosphorous |
| g) | Silica flour (120 mesh) | 8.5 - 10.5 | inorganic |
| h) | Glass beads - Zeosphere | 2.5 - 4.5 | inorganic |
| i) | Calcium aluminate cement | 12.5 - 14.5 | inorganic |

The ingredients of the additive are mixed blended at ambient (room) temperature until fully incorporated. The additive in its final form is a white fine powder.

Reactable inorganics such as calcium aluminate cement and silica flour react in consequence of water generated from the melamine, resulting in a firm, cementitious structure, adding rigidity and strength. Non-reactive inorganic microballoons and solid inorganic spherical particles are encapsulated within the structure, adding to the insulative capacity. These ceramic constituents are resistant to extremely high temperatures; insulate the substrate; add rigidity and strength to the char; reflect IR radiation or absorb IR and reemit; and suppress afterglow. After the reaction cycle is complete, the dispersed ceramic/inorganic components will serve to mitigate against high temperature and pressure gradients from penetrating to the substrate.

The flame retardant composition is generally employed in an amount of 20 weight percent to about 70 weight percent, preferably 25 weight percent to 60 weight percent, and most preferably 30 to 60 weight percent, all these weight percents based on total coating solids.

The coating may contain one or more auxiliary flame retardant compositions. Suitable additional flame retardants include inorganic compounds such as alumina trihydrate and alkaline earth metal hydroxides, polyphosphates and carbonates. However, the flame retardants are preferably organophosphorus compounds, most preferably organophosphate or phosphonate esters. Suitable phosphorus-containing flame retardants include dialkyl alkylphosphonates and trialkylphosphates. A preferred auxiliary liquid phosphorus-containing flame retardant is Fyrol® DMMP flame retardant, available from Akzo Nobel, dimethyl methylphosphonate, present in an amount of 1 to 10% by weight, preferably 4 to 10% by weight.

The coating contains from 1 to about 12 weight percent, preferably 2 to 10 weight percent, and more preferably 3 to 7 weight percent of glass or ceramic microballoons, preferably the latter, having a mean diameter of from 40 $\mu$m to 150 $\mu$m, preferably 60 $\mu$m to 120 $\mu$m, and more preferably 80 $\mu$m to 110 $\mu$m. The particle size range of the microballoons is not critical, and may vary, for example, from 5 to 200 $\mu$m (broad distribution) to 90–100 $\mu$m (narrow distribution), for example. These size ranges are illustrative for microballoons having a mean size of about 95 $\mu$m. Microballoons with a mean size of 80–110 $\mu$m and a narrow particle size distribution are preferred. Most preferred are Extendospheres™ TG available from the PQ Corporation. The microballoons serve numerous purposes, including extending the volume of the coating without supplying combustible material, rendering the coating lightweight due to its lower density, and acting as an initial, precombustion insulative material. When exposed to very high temperature, the microballoons can serve as an inorganic non-fugitive binder for the remaining ingredients. Solid ceramic spheres may be included as well. The weight percentages of microballoons include any amount supplied with the flame retardant composition.

Expandable flake graphite is a most important component of the coating. Expandable flake graphite can be distinguished from ordinary graphite, and is prepared by oxidative or electrolytic treatment of crystalline flake graphite and possesses unique exfoliative properties upon heating, swelling or expanding to many times its initial volume. The degree of expansion is preferably from 10 to 500 times (measured as bulk density) of its pre-expanded density, preferably from 12 to 20 times its original density. In addition, the exfoliated graphite particles tend to cling together, preventing loss of the coating when subjected to high temperatures. The exfoliated particles provide a substantially non-flammable, highly insulative layer over the substrate. Suitable expandable flake graphite is available from Asbury Graphite Mills, Inc., Asbury, N.J. The expandable flake graphite is employed in an amount of from 5 to 30 weight percent, preferably from 8 to 20 weight percent, and most preferably from 10 to 15 weight percent.

In the insulation system, expandable crystalline graphite dispersed in the composition swells to many times its original volume, trapping catalyzed carbonifics between the stacked layers of graphite particles, contributing, along with the blowing agent, to a rapid increase in structural volume. The expanded composition forms an efficient insulative shield against heat penetration.

Additional ingredients may also be present in the coating composition. A preferred additional ingredient is a thickener. A variety of thickeners may be employed, including both inorganic and organic thickeners. Suitable inorganic thickeners include very small particle size inorganic particulates, generally with mean particle sizes less than 2 $\mu$m, preferably below 1 $\mu$m, and with BET surface areas in the range of 20 $m^2/g$ to 500 $m^2/g$, more preferably 50 $m^2/g$ to 300 $m^2/g$. Preferred inorganic thickeners include colloidal silica and fumed silica, preferably the latter The amount used may vary, but is sufficient to thicken the composition to such an extent that a flowable viscous coating composition is obtained, as is the case also with organic thickeners. The thickener also contributes to the shelf-life (non-sedimentation) of the coating composition.

Organic thickeners include cellulose derivatives such as methyl cellulose, ethyl cellulose, propyl cellulose, hydroxypropyl cellulose and carboxymethyl cellulose; various gums such as guar gum, gum tragacanth, and the like; polyvinyl alcohol polymers, polyvinyl pyrrolidone polymers, and in particular, polycarboxylic acid polymers such as polyacrylic acid, polymaleic acid, and copolymers containing a high proportion of acid groups such as styrene/acrylic acid copolymers, acrylate/acrylic acid copolymers, and the like. Carboxyl-functional thickeners generally require treatment with a base such as ammonia or sodium or potassium hydroxide to significantly increase dispersion viscosity. Carboxyl-functional film-forming polymers such as the Acrysol™ polymers available from Rohm and Haas can also function as thickeners, and thus may provide a dual function. A preferred thickener is PG 500, manufactured by Para-Chem, Simpsonville, S.C.

Fillers can be added as well. In this sense, fillers are solid inorganic materials of larger particle size and smaller surface area than inorganic thickeners. Such fillers, for example, exhibit little increase in dispersion viscosity except when employed in relatively large amounts. The particle size may range from 10 $\mu$m to 500 $\mu$m, with sizes in the range of 40 $\mu$m to 200 $\mu$m being preferred. The amount may range from 1 weight percent or less to about 20 weight percent, preferably 1 weight percent to 10 weight percent.

Expandable mica or exfoliated (expanded) mica may also be employed. When expandable mica is employed, it may replace up to half of the expandable graphite employed. Preferred amounts of expandable mica range from less than 1 weight percent to about 10 weight percent. Expanded mica may preferably range from less than 1 weight percent to about 5 weight percent.

The coating is prepared by admixing the various ingredients. Preferably, the film-forming polymer dispersion is adjusted to basic pH in the range of 8–9, this adjustment dependent upon the film forming polymer and thickeners employed, if any, following which flame retardant, if used, is added and thoroughly mixed. The expandable graphite is preferably supplied in the same dispersion as the film-forming polymer, or is added at this stage. The fire retardant and smoke suppressant is then added, followed by addition of microballoons. The thickener must then be added, and the pH adjusted if necessary to provide desired viscosity. As with the graphite, the thickener may be supplied in the same dispersion as the film-forming polymer. The finished formulation is generally filtered through a suitable filter, i.e., one of 40–120 mesh, preferably about 40–60 mesh, and containerized.

The insulative coating compositions of the present invention may be used for the pre-installation or post-installation coating of structural and utilitarian components. By the term "structural component" is meant an article which contributes to the structure of a building or other construction which is desired to have an insulative coating. Examples include, but are not limited to, structural steel, i.e., I-beams, channels, plates, etc., similar structural aluminum items, cast concrete structures, including walls, columns, beams, etc., both reinforced or non-reinforced, roofing materials, flooring materials, fire doors, etc. The coatings are not generally applied to combustible materials.

By the term "utilitarian component" is mean an article which in general does not contribute to the structure of the building per se, but which is used to provide utilities to the structure, including but not limited to water lines, sprinkler lines, HVAC runs, electrical cable (i.e., "Greenfield") and/or conduit (i.e., "EMT") communications conduit, gas lines, etc.

Pre-installation coating of structural and utilitarian substrates is preferably practiced. In this application, the substrate is coated by conventional coating techniques and dried. Either during or after drying to remove water, the temperature may be adjusted to ensure coalescence of the film-forming polymer. If the film-forming temperature is low, room temperature may be sufficient for forming the coating. Otherwise, an elevated temperature, i.e., from 30° C. to 200° C., preferably 50° C. to 100° C. may be employed. The thickness of the coating may be adjusted for the degree of insulation required of the particular application. For example, structural steel may receive a thicker coating than electrical conduit, as structural steel will ordinarily not be deformed significantly during installation, and can therefore tolerate a thicker coating. Likewise, cast iron or "black iron" threaded conduit, gas lines, water lines, etc., are generally installed in straight sections and can therefore tolerate thicker coatings. Coatings may preferably range in thickness from 0.1 mm to 20 mm, preferably from 0.5 mm to 10 mm, more preferably 0.8 mm to 5 mm, and most preferably from 1 mm to 3 mm. Coatings of about 47 mil (1.19 mm) have been proven most useful, while coatings of from 15–20 mil (0.38 to 0.51 mm) have proven successful when only a modest degree of insulative capacity is required, but corrosion resistance is necessary. The coatings have proven to be excellent anti-corrosion coatings as well.

The coating may be applied to flat surfaces by spraying, roll-coating, knife-edge or doctor blade coating, or the like, followed by drying at room temperature or elevated temperature as dictated by the particular film-forming polymer, to form an adherent, durable coating. Non-planar surfaces may be coated by die-coating, spraying, brushing, dipping, or the like, and dried similarly. Any coating method which generates the desired coating thickness in one or more applications may be employed. This type of pre-installation coating may also be termed "manufacturing coating," as it is applied remote from the building site, preferably by the manufacturer or distributor of the products. This type of manufacturing, pre-installation coating is highly preferred.

Pre-installation coating may also be performed at the job site. This method is particularly useful with coatings employing thermosettable or low film formation temperature polymer dispersions, so that heated drying (or curing) is not necessary. Spray application or brush application are preferred application methods. This type of pre-installation coating may also be termed "post-manufacturing" coating.

Post-installation coating is performed after the structural or utilitarian components have been at least partially installed at the site. Preferred application methods include spraying and brush or roller coating, although the application method is not critical. One or a plurality of coatings may be applied. Post-installation coating may also be applied over pre-installation coatings, either to increase the coating thickness, or to repair damaged areas as a result of manipulation during installation.

It has been discovered that while the present compositions adhere exceptionally well to substrates such as steel conduit, steel beams, black iron pipe, etc., their adherence to zinc galvanized substrates under fire conditions is not fully satisfactory. In such applications, for example galvanized conduit often used in bridges and tunnels where exposure to salt water or brackish water may be expected, it is preferable to employ a fiberglass or ceramic, or other inorganic fiber (i.e. carbon/graphite fibers) mesh material to facilitate obtaining a fully integral char/insulator. The mesh material is preferably a loosely woven material which may be saturated with the fire retardant composition and then wrapped around the substrate, either without additional coating or prior to or subsequent to application of additional coating, or the substrate may first be coated and the mesh then applied. Alternatively, the mesh may be applied without coating, and the coating subsequently applied. Any manner of coating is acceptable, provided the mesh is ultimately impregnated with uncured composition. Thus, for example, the mesh should, in general, not be applied to the substrate following drying (curing) of the composition on the substrate, as the mesh would partially prevent expansion of the composition when exposed to fire. It has been found that by using a loose mesh which is substantially impregnated with composition prior to drying, the effectiveness of the composition remains high. The coating is thus contained at least in a portion of the open spaces of the mesh material, and may also be both within and without the mesh material as well. The coatings and mesh may be applied in plural layers.

For uses which require yet higher insulation efficiency, the coatings of the subject invention may be employed with non-woven insulation products. The term "non-woven" is used in its conventional sense as an insulation material with numerous intertwined fibers which are not woven. Examples of such materials include fiberglass insulation as conventionally used in insulating buildings, i.e. spun glass fibers, as well as "felted" products which are produced by laying down strands of glass fibers and extensively needle-punching with barbed needles to break and entangle the fibers to produce a coherent and "lofty" product.

When such non-woven insulation is used, it may be fully or partially saturated with the composition of the present invention, and may be applied in one or more layers. Preferably, the non-woven insulation is only partially saturated such that the amount of air pockets remaining in the insulation is high. The air pockets are themselves efficient insulators. For example, when a two layer construction is employed, the first layer may be appreciably wet-out on both surfaces of the first non-woven layer and the second layer adhered to the first by the subject invention composition. Increased adhesion, if required, may be achieved by applying the composition to the abutting surface of the second layer as well.

Whether pre-installation, post-installation, or combinations of these are used, the coating may be overlaid by further coatings to increase durability or alter surface characteristics. For example, structural steel I-beams may be oversprayed with an anti-slip coating such as one containing grains of sand, to facilitate walking the beam during installation. Coatings which impart a harder and/or yet more durable surface may also be applied. Such coatings may be in the form of aqueous dispersions of thermosettable or film-forming polymers. The latter dispersions may be similar to those of the insulative coating, but with a higher film-forming polymer content, or free of one or more of the insulative and/or fire-retardant or smoke-suppressive components. Such coatings are generally quite thin, for example less than 0.5 mm, preferably less than 0.25 mm, and more preferably less than 0.1 mm.

EXAMPLE 1

Coating Preparation

An insulative coating composition is prepared by admixing 15.73 parts of an acrylic acid/styrene/acrylic copolymer Paranol® SA207 available from Para-Chem Corp., Simpsonville, S.C. with 7.81 parts of expandable graphite, available from Asbury Graphite Mills, and 0.625 parts of, a neutralizable, alkali-soluble polymeric thickener available from Eastman Chemical, Kingsport, Tenn. The resulting aqueous composition contains about 40 weight percent solids.

To 625 parts of the above composition is added 50 parts Fyrol® DMMP, available from Akzo Nobel, using a mild shear blade. While continuing to mix, 300 parts of the flame retardant composition of Table 1 is added and mixed to uniformity. 25 parts of Extendospheres TG, available from The PQ Corporation, are then added and mixed to uniformity, but minimally, to avoid excessively rupturing the microballoons. The finished formulation is filtered through a 40 mesh filter and containerized.

EXAMPLE 2

A piece of sheet steel measuring 14" by 14" (35.6×35.6 cm) and having a thickness of about 0.625 inch (1.6 cm) is coated with sufficient of the coating of Example 1 to form a coating having a dry thickness of 47 mil (1.2 mm). This test plaque is exposed to the flame of a 1700° F. torch for 86 minutes, the flame on the side of the coated surface. The coating expands to 14–16 times its original thickness, and becomes highly insulative, as demonstrated by the relatively low temperature (1000° F.) on the side remote from the flame, even after 86 minutes of exposure. The coating remains adherent to the plaque.

EXAMPLE 3

A section of standard mild steel electrical conduit was coated with the coating mixture of Example 1 and dried to form a dry coating of 65 mil (1.65 mm) thickness. The coated conduit is bent by a conventional conduit bender. The coating remains intact despite the bending operation. When exposed to direct flame, the coating expands to many 14–16 times its original thickness and remains adhered to the conduit. The coating is highly insulative.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A metal electrical conduit having disposed thereon a flexible and intumescent fire protective coating which expands at high temperature to form a thermally insulative coating, said protective coating being a dried continuous coating of an aqueous liquid composition containing a polymer binder and substantially free of organic solvents.

2. The conduit of claim 1, wherein said composition comprises at least one film forming polymer binder, glass or ceramic microballoons, and a thermally expandable inorganic material.

3. The conduit of claim 1, wherein said composition comprises
   a) an aqueous dispersion of one or more film-forming polymers in an amount sufficient to provide from 20 to 70 weight percent film-forming polymer;
   b) a flame retardant composition in an amount of from 20 weight percent to 70 weight percent, said flame retardant composition comprising a carbonific, a blowing agent, a fire snuffing agent, and a fusible inorganic substance;
   c) from 1 to 10 weight percent of glass or ceramic microballoons having a mean particle size of 40 μm to 150 μm; and
   d) 5 weight percent to 30 weight percent of expandable flake graphite, and
   e) optionally, from 1 to about 10 weight percent of a phosphorous-based flame retardant,
wherein all weight percents are based on total solids of the coating composition, and total 100% with respect to components a) through e).

4. The conduit of claim 3, wherein at least one film-forming polymer is a thermoplastic film-forming polymer.

5. The conduit of claim 3, wherein said flame retardant is a non-halogenated organophosphorus flame retardant present in an amount of 4 to 10 weight percent.

6. The conduit of claim 3, wherein both a flame retardant composition and a phosphorus-based flame retardant is employed.

7. The conduit of claim 3, further comprising an inorganic and/or organic thickener and optionally a filler.

8. The conduit of claim 1, wherein components of the coating, prior to coating on said component, comprise
   a) an aqueous dispersion of a film forming polymer in an amount sufficient to provide from 20 to 70 weight percent polymer based on the weight of the cured composition;
   b) an expandable inorganic material in an amount of from 5 to 30 weight percent, said expendable inorganic material selected from the group consisting of expandable graphite and expandable mica, expendable mica comprising less than 50% by weight of the expendable inorganic material;
   c) from 1 to about 10 weight percent of glass and/or ceramic microballoons having a mean particle size of from 20 μm to 150 μm;
   d) a carbonific in an amount effective to form a char when said building material is exposed to high temperature;
   e) a blowing agent which generates gas at elevated temperature, said blowing agent present in sufficient quantity to produce a charred coating of increased thickness as compared to an otherwise similar composition devoid of said blowing agent;
wherein said weight percents are based on the total weight of the coating.

9. The metal electrical conduit of claim 1, further comprising a mesh material of inorganic fibers disposed around an exterior of said metal electrical conduit, said coating disposed within openings in said mesh material.

10. The metal electrical conduit of claim 9 wherein said mesh material comprises woven fiberglass.

11. The metal electrical conduit of claim 1 wherein said conduit comprises a steel tubing, iron piping, or flexible metal conduit.

12. The component of claim 1, wherein said coating, prior to expansion, has a thickness of from 0.5 mm to 5 mm.

13. The component of claim 1, wherein said coating, prior to expansion, has a thickness of from 1 mm to 5 mm.

14. A process for the manufacture of the metal conduit of claim 1, comprising
   supplying a length of metal conduit,
   applying a continuous coating of a liquid, aqueous fire protective composition substantially free of organic solvent onto the exterior of said conduit, and
   drying said fire protective composition,
wherein said thermally insulative coating is a flexible and intumescent coating.

15. The process of claim 14, wherein said coating contains expandable graphite and hollow microspheres of glass or ceramic.

16. The process of claim 14, wherein said liquid composition is first applied to a mesh material of woven inorganic fibers prior to applying to said exterior of said conduit and subsequently drying said composition.

17. The process of claim 14, wherein said composition comprises a film forming polymer binder in an amount greater than 20 weight percent based on solids, at least one expandable inorganic material selected from the group consisting of mica and graphite, and from 1 to 10 weight percent of glass or ceramic microballoons or mixtures thereof.

* * * * *